(12) United States Patent
Gerakoulis

(10) Patent No.: US 7,620,031 B1
(45) Date of Patent: Nov. 17, 2009

(54) METHOD AND APPARATUS FOR CODE DIVISION SWITCHING

(75) Inventor: Diakoumis Parissis Gerakoulis, Dover, NJ (US)

(73) Assignee: AT&T Corp., New York, NY (US)

( * ) Notice: Subject to any disclaimer, the term of this patent is extended or adjusted under 35 U.S.C. 154(b) by 530 days.

(21) Appl. No.: 11/218,036

(22) Filed: Aug. 31, 2005

Related U.S. Application Data

(63) Continuation of application No. 09/741,540, filed on Dec. 20, 2000, now Pat. No. 6,954,440.

(51) Int. Cl.
*H04B 7/216* (2006.01)
(52) U.S. Cl. ............... 370/351; 370/323; 370/337; 370/342; 370/371
(58) Field of Classification Search .......... 370/321, 370/322, 323, 324, 325, 326, 337, 335, 342, 370/372, 371, 370
See application file for complete search history.

(56) References Cited

U.S. PATENT DOCUMENTS

| | | | | |
|---|---|---|---|---|
| 5,390,166 | A | * | 2/1995 | Rohani et al. ............... 370/335 |
| 5,438,565 | A | * | 8/1995 | Hemmady et al. .......... 370/335 |
| 5,663,990 | A | * | 9/1997 | Bolgiano et al. ............ 375/138 |
| 5,875,181 | A | * | 2/1999 | Hsu et al. ................... 370/320 |
| 5,894,473 | A | * | 4/1999 | Dent .......................... 370/342 |
| 5,940,379 | A |   | 8/1999 | Startup et al. |
| 6,078,576 | A | * | 6/2000 | Schilling et al. ............ 370/347 |
| 6,081,531 | A | * | 6/2000 | Haber ........................ 370/400 |
| 6,144,654 | A | * | 11/2000 | Ibanez-Meier et al. ...... 370/342 |
| 6,452,917 | B1 | * | 9/2002 | Leung ......................... 370/342 |
| 6,516,020 | B1 |   | 2/2003 | Kurihara |
| 6,535,503 | B1 | * | 3/2003 | Toskala et al. .............. 370/349 |
| 6,954,440 | B2 | * | 10/2005 | Gerakoulis .................. 370/320 |
| 2002/0191566 | A1 | * | 12/2002 | Fogel .......................... 370/335 |

FOREIGN PATENT DOCUMENTS

EP     0803992     10/1997

OTHER PUBLICATIONS

Ho, K.K.; Architectural design of a code division multiple access cellular system Vehicular Technology Conference, 1992 IEEE 42nd May 10-13, 1992 pp. 47-50 vol. 1.*

Ortigoza-Guerrero, L.; Aghvami, A.H.; A distributed dynamic resource allocation for a hybrid TDMA/CDMA system; Vehicular Technology, IEEE Transactions vol. 47, Issue 4, Nov. 199.*

Diakoumis Gerakoulis, et al., "Throughput Evaluation of a Satellite Switched CDMA (SS/CDMA) Demand Assignment System", Global Telecommunications Conference, 1998, IEEE, p. 3632.-3638.

* cited by examiner

*Primary Examiner*—Michael J Moore, Jr.
*Assistant Examiner*—Lonnie Sweet

(57) ABSTRACT

Time division multiplexed input signals (i.e., separated into time slots) are spread in each time slot with a destination code. This spreading is applied for destination identification as opposed to signal information modulation. Each spreading signal is associated with a particular destination for a particular time slot. These spread signals are then combined on a code division bus. Output signals for retransmission to the destinations are recovered from the bus by application of despreading codes. Each despread signal has a destination code which appears in its individual time slot. In a variant code division multiplexed signals are directed to a destination by use of time slot interchanger to achieve time division switching to route the CDMA multiplexed channels.

1 Claim, 7 Drawing Sheets

301

US 7,620,031 B1

METHOD AND APPARATUS FOR CODE DIVISION SWITCHING

This application is a continuation of U.S. patent application Ser. No. 09/741,540 filed Dec. 20, 2000 now U.S. Pat. No. 6,954,440 entitled METHOD AND APPARATUS FOR CODE DIVISION SWITCHING, which has been allowed. The aforementioned related patent application is herein incorporated by reference.

FIELD OF THE INVENTION

This invention is concerned with signal switching technology and in particular the use of code division switching (CDS) techniques in time multiplexed switching systems for accomplishing switching and with the control of such switching. It is specifically concerned with control mechanisms for such a switch used in time division multiplexed communications systems.

BACKGROUND OF THE INVENTION

Code Division Switching (CDS) has been priorly discussed with relation to performing switching functions concerning processing CDMA modulated signals on board a satellite in communication systems using CDMA (Code Division Multiple Access) transmission technology. Examples of CDS have been disclosed in the U.S. Pat. No. 5,815,527 and in the U.S. Pat. No. 5,995,497. These references disclose a switching technology for CDMA modulated user signals in which multiple CDMA encoded beam signals received by the switch are further CDMA encoded with the individual component user signals of the beam which is also CDMA encoded. Encoding signals (e.g., PN; Walsh; Quadratic; etc. codes) are applied to the beams and user signals (i.e., uplink in the instance of a satellite switch). These signal codes are carefully selected to prevent intersignal and interbeam interference from exceeding an acceptable level. At the switching level the user signals and beams are despread recovering the base signals and/or channels. These signals are recombined into CDMA modulated beams in which the individual user signals of any beam have a destination in common with that of the beam as defined by the applied spreading codes.

SUMMARY OF THE INVENTION

Therefore in accord with principles of the invention time division multiplexed input signals (i.e., separated into time slots), in one exemplary embodiment, are spread in each time slot with a destination code. This spreading is applied for destination identification as opposed to signal information modulation. Each spreading signal is associated with a particular destination for a particular time slot. These spread signals are then combined on a code division bus. Output signals for retransmission to the destinations are recovered from the bus by application of despreading codes. Each despread signal has a destination code which appears in its individual time slot. In another exemplary embodiment a time multiplex switch directly switches CDMA signals. In a variant of this a time slot interchange is used.

Code division multiplexing and/or code division used for switching time multiplexed signals is a technology utilizing the code spreading properties of code division as a technique of switching traffic channels and/or beams and individual signals (i.e., selecting point-to-point and point-to-multipoint paths for a particular channel/tine slotted signal to follow).

In an exemplary method of using code division for switching purposes, where a plurality of individual user signals are included in a composite beam, Each user signal within each beam is assigned a set of orthogonal codes which identifies that user. Pseudorandom (PN) codes are assigned to the beams for purposes of providing a cover code and suppressing interference between the beams. Another set of orthogonal codes is additionally provided for each beam for the purpose of providing orthogonal isolation between beams (i.e., nee3ded if a large plurality of beams are transmitted). In the process of spreading the PN codes and orthogonal user codes are applied at one rate. A process of overspreading uses a spreading code having a higher rate than the basic spreading rate. The various codes enable identification of user signals and beams and further allow extraction of individual user signals. Hence beams can be constructed of user signals having a destination in common with the beam. The coding is for providing signal identity and identity of signal destinations.

A Code Division Switch (CDS), embodying the principles of the invention, includes a control unit that controls switch assignments based on signaling information received during establishment of a call. Upon the arrival of a call a user sends a request to a control unit of the CDS to make a switch assignment. The switch records all requests received within a defined time frame and applies an algorithm, which assigns the incoming and outgoing traffic channels. These assignment decisions are transmitted back to the users whereby each user transmits data on the assigned traffic channel. The CDS provides the circuits for traffic recovery and respreading to route each call in accord with the assignment decisions.

DETAILED DESCRIPTION

Code division, as a switching technique, has been used with CDMA modulated signals in many applications. It is readily applicable to CDMA modulated signals since the varied signals use a common frequency band with the CDMA coding capturing information for each individual channel. It was extended to switching CDMA modulated signals aboard a satellite by the use of over spreading to supply a destination code, which was used to combine signals having a common destination into a beam of signals directed to the particular destination. This switching technique is combined herein with the switching of signals having time division modulation.

Figure 1A:
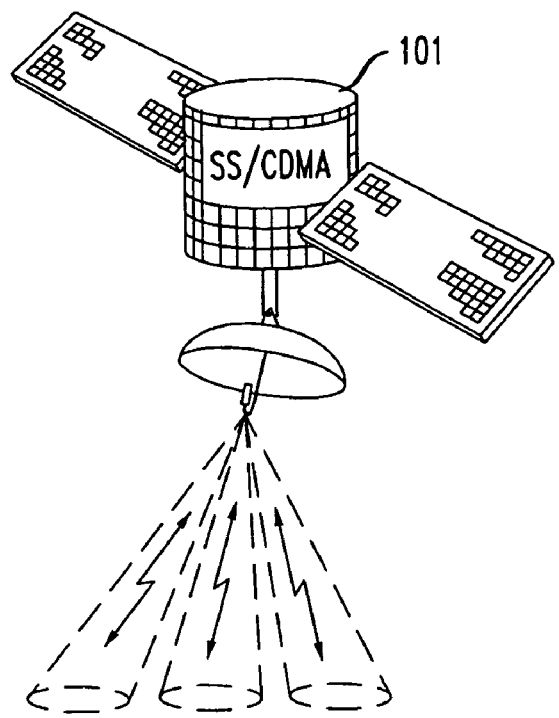
FIGS. 1A, 1B and 1C are block diagrams schematically displaying applications of a Code Division Switch (CDS) architecture.
Figure 1B:
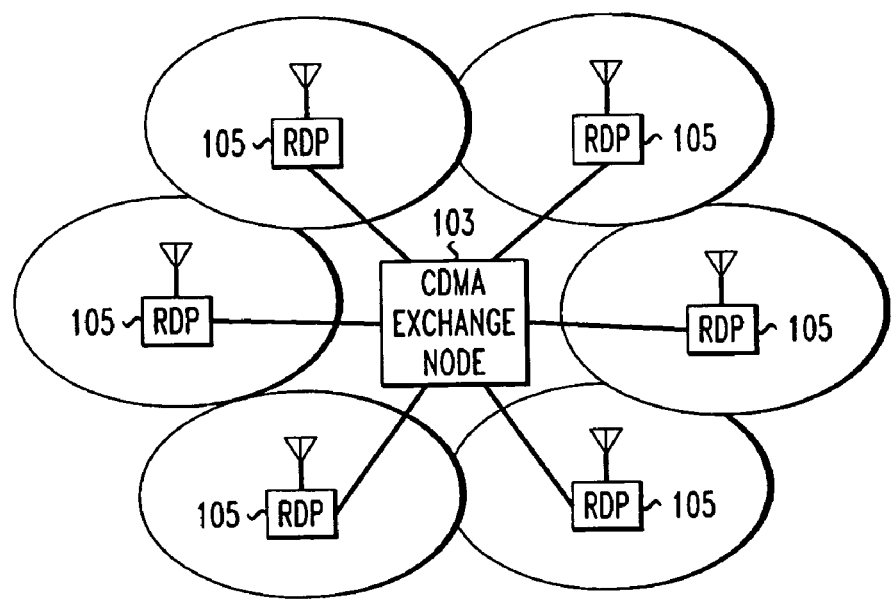
Figure 1C:
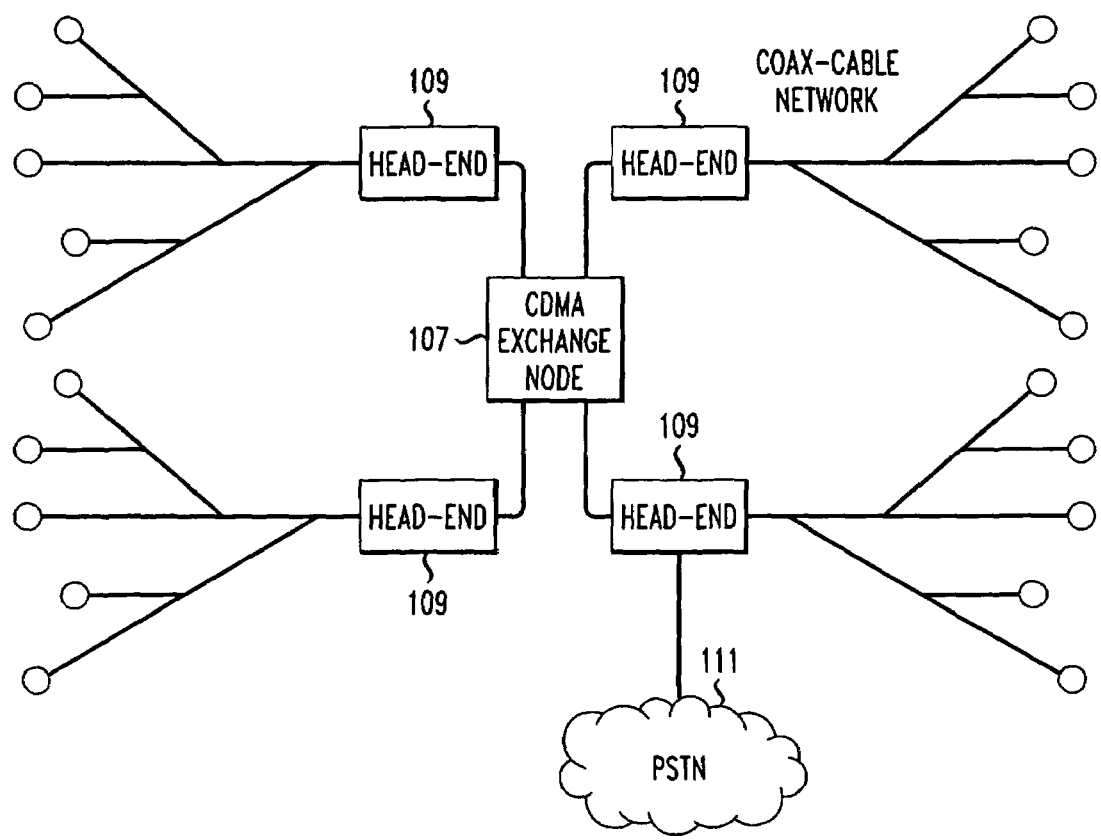

Code division switching may be utilized in many applications including satellite switching as well as terrestrial applications. Such terrestrial applications include base station switching in mobile and fixed wireless systems; switching in wired and cable systems. These various applications are shown in the FIGS. 1A, 1B and 1C. The satellite switch 101 in FIG. 1A includes an exchange node (i.e., code division switch) and operates to switch uplink signals into downlink beams directed to particular ground stations. A wireless system shown in the FIG. 1B uses a code division switch (i.e., exchange node) in a base station 103 to interconnect various radio distribution points 105. A cable communication system shown in FIG. 1C uses a code division switch 107 (i.e., exchange node) to interconnect various head ends 109 and a public Switched telephone network (PSTN) 111. In each of these examples the Exchange node is using time multiplexed switching in combination with code division techniques.

Figure 2:
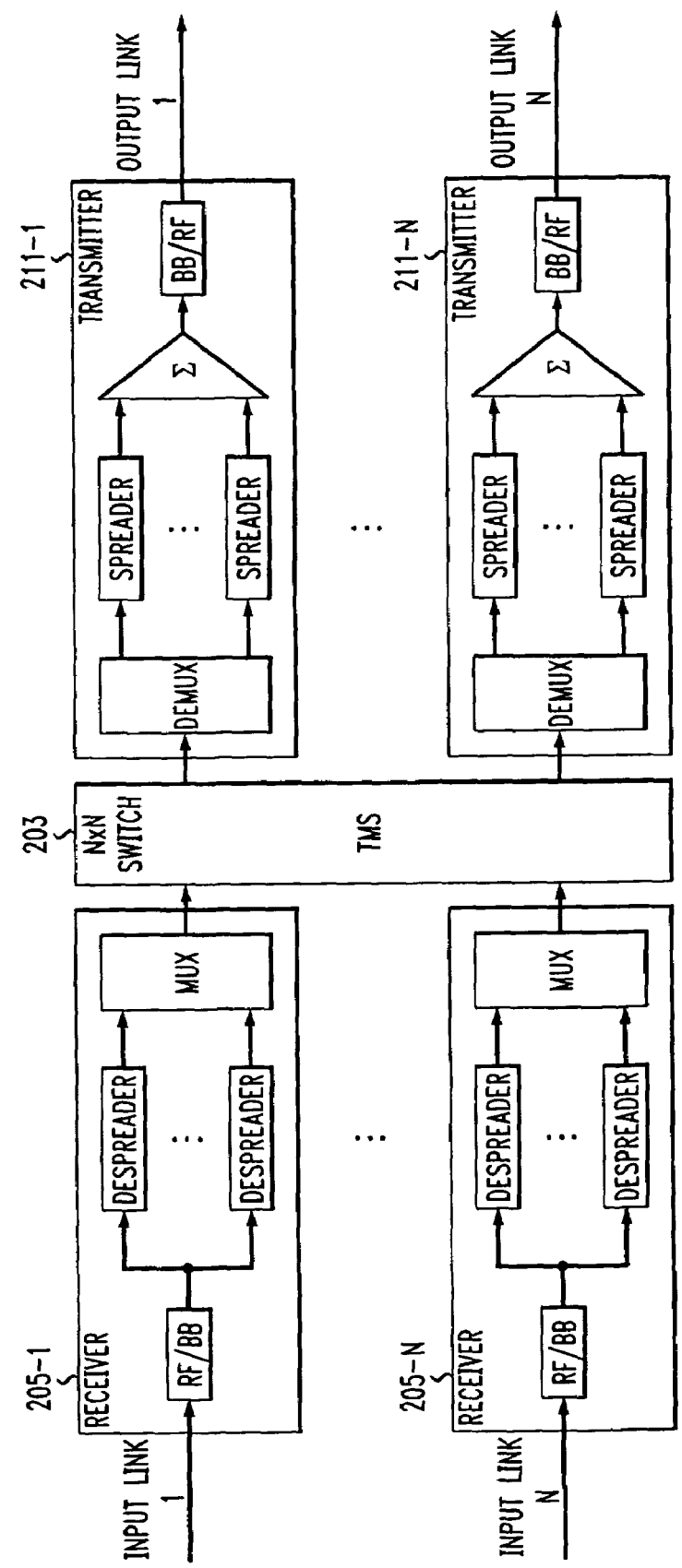
FIG. 2 is a block schematic of an exemplary Code Division Switch used in a time division multiplexing application.

A time multiplex switch directly switching input CDMA signals achieves time multiplexing of CDMA signals. In this particular switching arrangement, shown in FIG. 2, the input and output ports of the switch are time multiplexed and the individual signals are code division modulated. The switch 201 comprises a switch matrix 203, which is a time multiplex switch (i.e., TMS). The code division modulated uplink inputs, to be switched are supplied to input links, which in the example include receivers 205-1 to 205-N, functioning for receiving and despreading CDMA signals. After despreading all the despread signals are applied to input ports of the TMS 203 where they are time multiplexed and switched and routed to an appropriate output port of the TMS 203. These output signals are time demultiplexed and by action of the transmitters 211-1 through 211-N are spread and code modulated for downlink delivery to their destinations. Design of this switch needs to consider the necessary time-to-time multiplex the input and output ports of the TMS 203.

Figure 3:
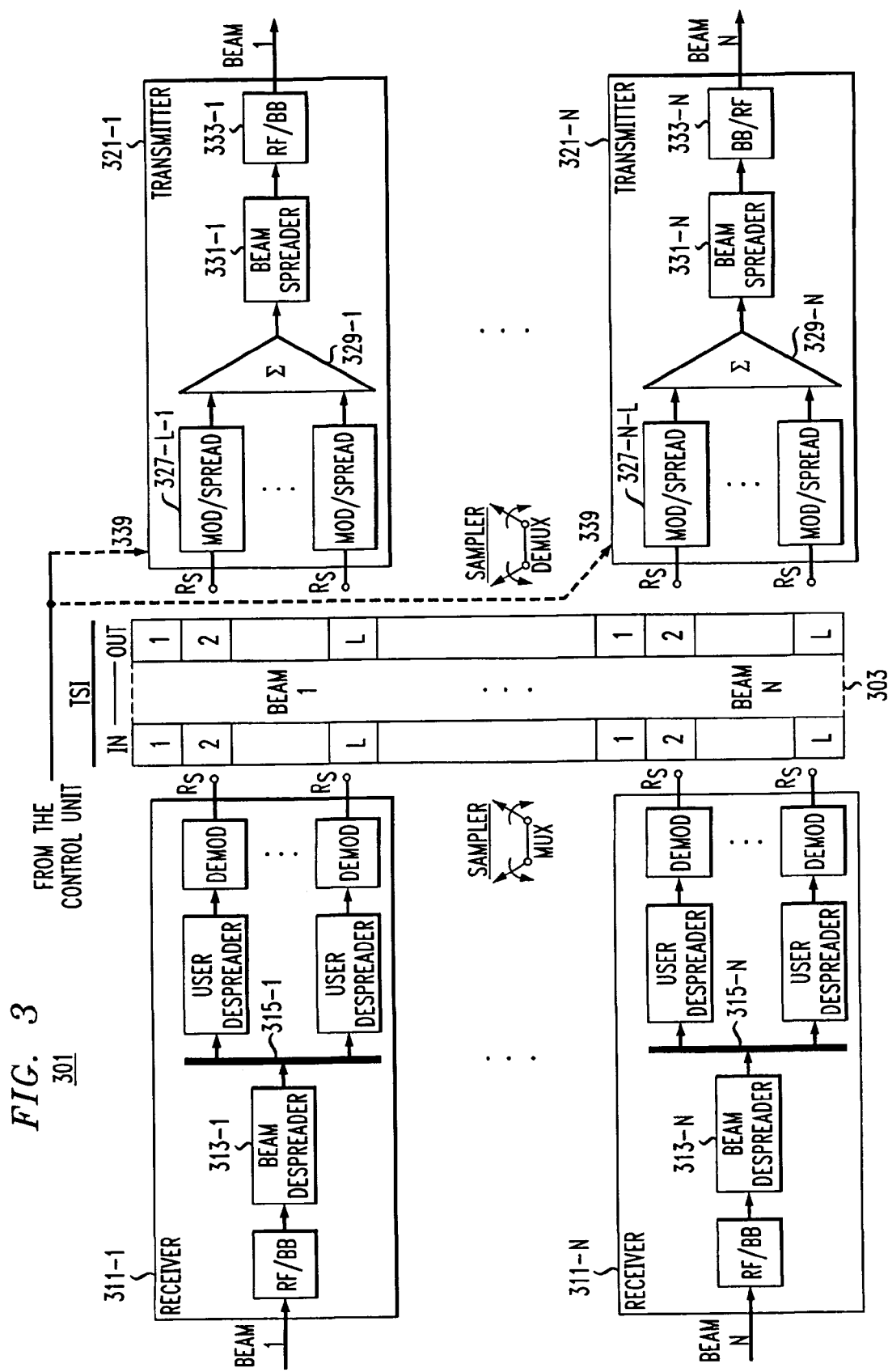
FIG. 3 is a block schematic of another exemplary Code Division switch used in a time division multiplexing application.

An improved switching system as shown in the FIG. 3 shows in detail a use of a time slot interchanger to achieve time division switching to route CDMA multiplexed channels. The incoming CDMA signals are despread and the data symbols are time multiplexed. Time slots, in coupling an input to an output, are determined by a time slot interchanger (TSI) 303. This TSI 303 enables a coupling of input receiving spreaders 305 to output transmitting spreaders 307 with less time delay than a traditional time division multiples switch. Time slots are rearranged in each frame of the TSI to interconnect incoming time slots with time slots so that an input signal is properly directed to a desired destination. Time slot interchangers operate to exchange the positions of time slots in a frame between an input and output port. These devices are a well known and widely used in data processing and transmission and a detailed description thereof is not believed necessary.

Input beams of a plurality of CDMA signals are received at CDMA receivers 311-1 through 311-N. Each receiver converts the receiver RF to BB or base band frequencies and despreads the incoming beam of CDMA signals in beam despreaders 313-1 through 313-N. These despread beams are applied to buses 315-1 through 315-N which is coupled to a plurality of user signal despreaders 319-1 through 319-N. The output of each despreader is demodulated and applied to the TSI 303. TSI 303 rearranges the time slots in each frame so that each outgoing signal is directed to a time slot corresponding to the signal destination. The despread signals are demodulated processed at a sampling rate $R_s$ and assigned to input time slots and assigned to a particular beam and coupled to appropriate time slots for sourcing an outgoing beam. Timing of the output slots and the appropriate respreading is controlled by a control circuit at input 339. The control unit assures that output timeslots are properly aligned with the appropriate respreading to direct the resulting beam to tits destination.

Output signals of the TSI 303 are applied to output transmitters 321-1 through 321-N. Each transmitter respreader includes modulation and spreading circuits 327-1 through 327-N to respread the signals. These respread signals are applied to a summing circuits 329-1 through 329-N to form beams. These beams are each spread for transmission purposes by the beam spreading circuit 331-1 through 331-N. The spread beam is modulated to RF for transmission by the modulation circuits 333-1 through 333-N.

Time slot interchangers have a size limit on the number of cross point connections that may be used. This may be addressed in large systems by combining space switching with multiple time slot interchangers in a multi stage system. One suitable arrangement contemplates a time division stage followed by a space division stage (e.g., providing fixed physical connections) which is then followed by a time division stage.

Figure 4:
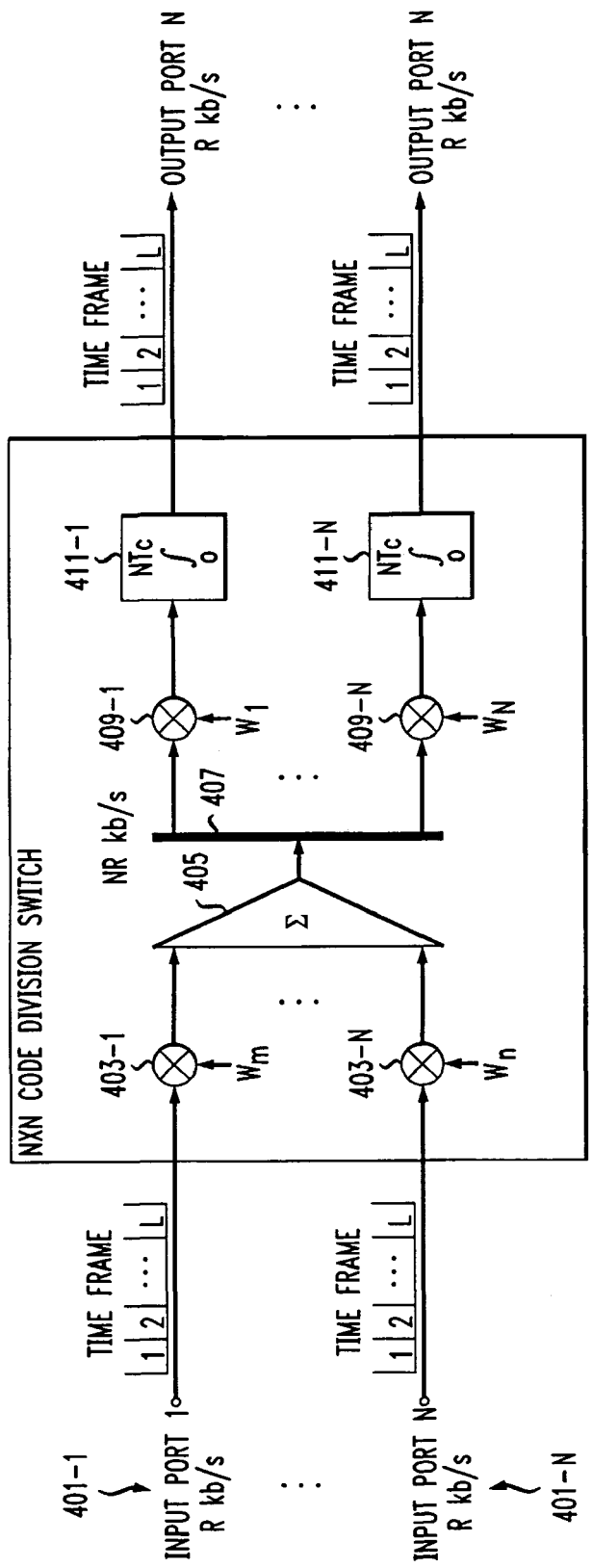
FIG. 4 is a block schematic of yet another exemplary Code Division switch used in a time division multiplexing application.

In an alternative arrangement joining time multiplexing with code division switching, time multiplexed or time divided input signals are switched by a code division switch into time slots of a time multiplexed or divided output signal. A code division switch is used instead of a time slot interchanger. A block schematic of a Code division Switch used in this application, as shown in FIG. 4, includes input ports 401-1 to 401-N which accepts frames including multiple time slots and included time division multiplexed user signals in each time slot. The frames are all spread by application of an orthogonal spreading code $W_n$ in spreaders 403-1 through 403-N and applied to a summing circuit 405 where all the spread signals are combined. The spreading codes applied are synchronized with the time slots and define the time slot destination of each of the time multiplexed frames. The combined signals are applied to a code division bus 407. Each of these code modulated signals, in the code division bus, has been spread so as to be orthogonal to one another and hence be non-interfering.

Coded modulated signals to be transmitted are recovered from the code division bus and despread in despreaders 409-1 through 409-N and are further processed by the filter integrators 411-1 through 411-N to recover the time modulated frame for transmission and the related destination.

The spreading and despreading signals are supplied to the spreaders and despreader on a time slot to time slot basis. The spreading codes $W_n$ and $W_N$ are supplied by a separate control unit discussed herein below.

Figure 5:
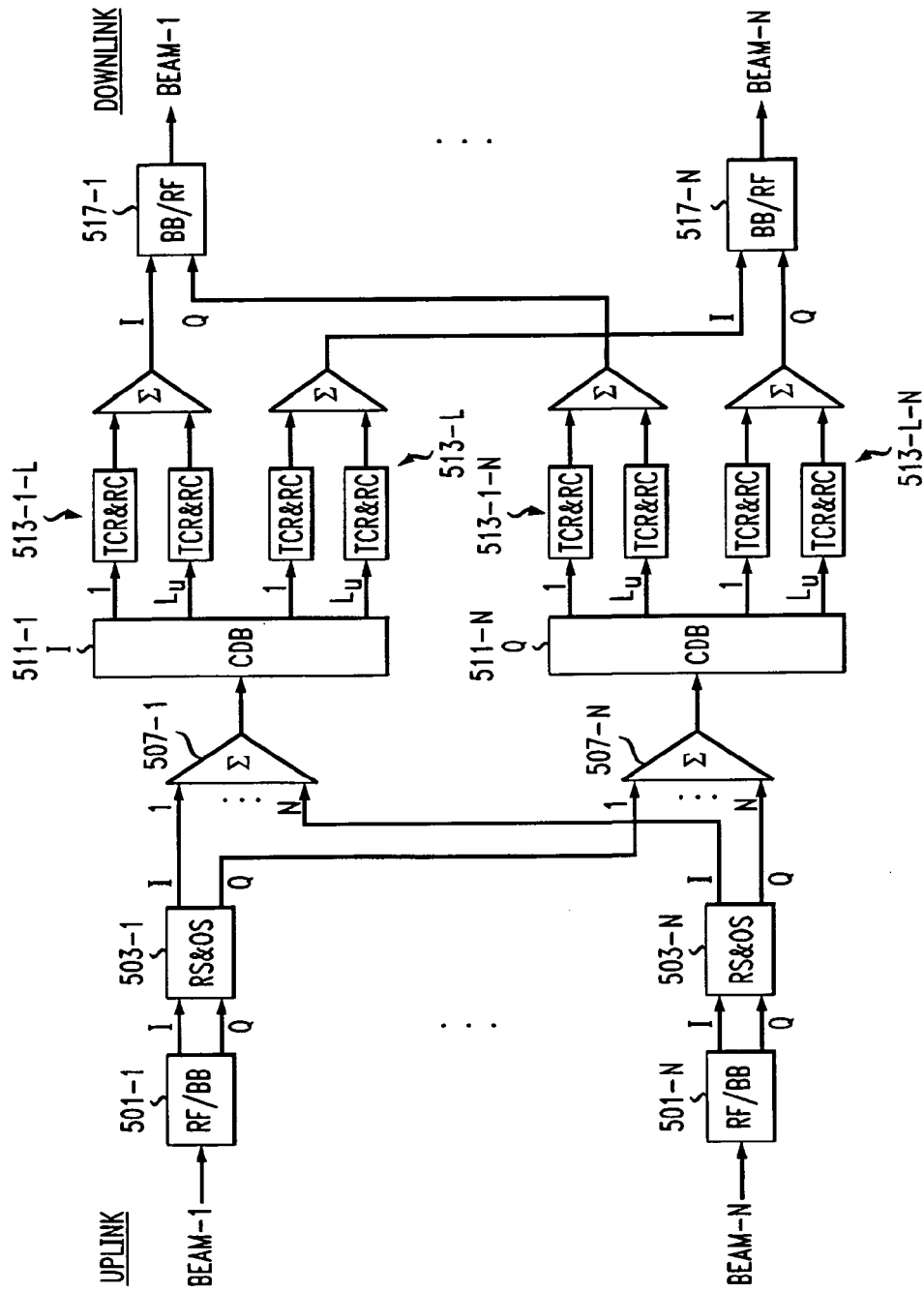
FIG. 5 is a schematic of still another exemplary Code Division switch used in a time division multiplexing application.

Many code division switch embodiments have been discussed in the aforementioned patents and may be used herein and are incorporated herein by reference. An alternative code division switch embodiment may process individual I and Q signals. One such alternative arrangement is shown in the FIG. 5 in which each set of the I and Q components of incoming beams are spatially separated and recombined into different combined sets for code division processing. In this arrangement a code division switch receives incoming beams which are applied to a RF to Base Band converter 501-1 through 501-N. The I and Q output of each converter is applied to respreading and overspreading circuitry 503-1 through 503-N. The I and Q signals are separated and applied to different summing circuits 507-1 through 507-N in reverse application. The summed I and Q signals are applied to the code division busses 511-1 through 511-N. The bus output is tapped into a plurality of traffic channel recovery circuit and respreading circuits (TCR&RC) 513-1 through 513-L equal to the number of channels (L) included within each beam. The TCR&RC circuits are coupled to summing circuits 515 and the I and Q outputs are applied to beam recovery and over-spreading circuits 517 which recover the downlink beam. By use of the spreading code, the down link beams are each identified for direction to its destination.

Figure 6:
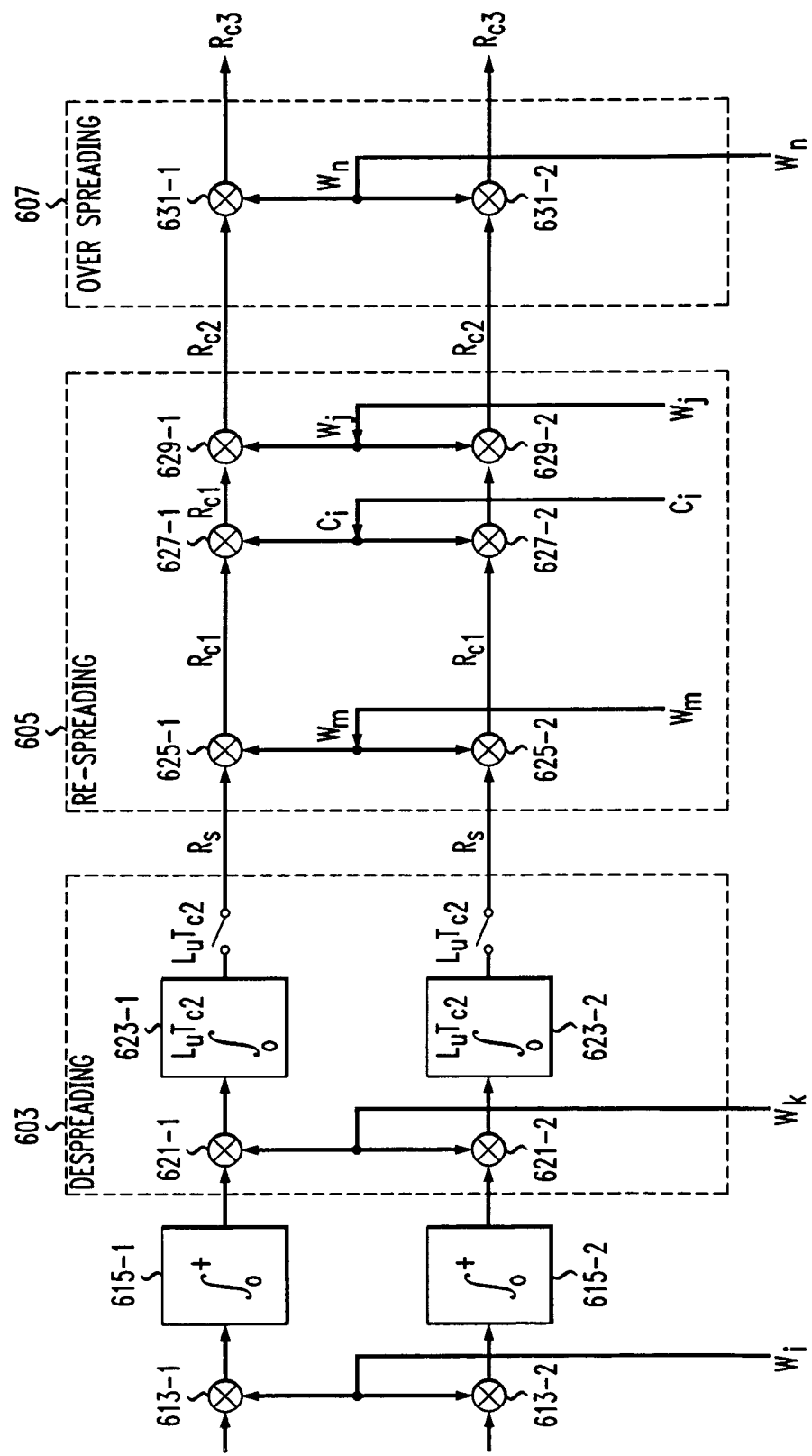
FIG. 6 is a schematic of a sub circuit used in the various Code division Switches.

A critical component in these switching arrangements is the traffic channel recovery and respreading circuitry (TCRC). Suitable circuitry for this purpose de-over-spreads despreads, respreads and re-over-spreads. Circuitry in FIG. 6, for this purpose has a de-over-spreading section 601, a de-spreading section 603, a Re-spreading section 605 and a re-over-spreading section 607. The various spreading and despreading operations are useful in supplying the coding to control user signal and beam destinations and to identify user signals chosen for each destination. The exemplary de-over-spreading circuit 601 illiterates parallel paths although the illustration is only exemplary (i.e., single path circuitry may be used). It includes an input to mixers 613-1 and 613-2, responsive to an orthogonal code $W_n$, which in combination with a subsequent integrating filter 615-1 and 615-2, de-over-spreads the incoming signal to identify particular beams. This is followed by section 603 that has similar components such as mixers 621-1 and 621-2 and integrating filters 623-1 and 623-2. It despreads for the purpose of recovering original user information signals and identifying the uplink users. Codes, such as $W_k$ (i.e., users uplink orthogonal code), are used to despread the de-over-spread signal. Respreading, to identify a downlink user occurs in section 605 that includes a plurality of serially connected mixers 625-1 and 625-2; 627-1 and 627-2; and 629-1 and 629-2. The applied codes are $W_m$ (user downlink code), and $C_i$ and $W_j$ (beam downlink codes). The spread signals are applied to the over-spreading section 607, which applies the code Wn to the sections mixers 631-1 and 632-2. This overspreading with an orthogonal code Wn achieves orthogonal separation between the system traffic channels allowing combining and summing operations on the signals. Further discussion of spreading and despreading circuitry is not believed necessary since such circuitry is well known in traditional applications of CDMA coding which is discussed in the US patents discussed herein above.

Various techniques of arranging and rearranging the components of the TCRC and other basic combinations to achieve specific CDM coding effects have been disclosed. The details of such devices may be attained by reviews of the US patents cited above and whose teachings are incorporated herein by reference.

What is claimed is:

1. A time division code switch, comprising:
    an input for accepting at least one code division modulated signal and including an input despreader to decode the at least one code division modulated signal into a plurality of Code Division Multiple Access (CDMA) beams;
    a code bus for delivering said plurality of CDMA beams to a plurality of user despreaders at the input;
    a time slot interchanger connected to the plurality of user despreaders to receive the CDMA beams that have been demodulated, the time slot interchanger re-arranging time slots of each frame to couple an input to a designated output;
    a respreading circuitry connected to the designated output of the time slot interchanger;
    a summer connected to the respreading circuitry to sum a plurality of spread signals having a common destination to form a beam directed to said destination; and
    an output for directing the beam to said destination.

* * * * *